United States Patent
Milic et al.

(10) Patent No.: US 6,958,367 B2
(45) Date of Patent: Oct. 25, 2005

(54) DECORATIVE COATING COMPOSITION FOR SOLID SUBSTRATES

(75) Inventors: Richard Milic, Hradec Kralove (CZ); Zdenka Kupcakova, Pardubice (CZ)

(73) Assignee: E. I. du Pont de Nemours and Company, Wilmington, DE (US)

( * ) Notice: Subject to any disclaimer, the term of this patent is extended or adjusted under 35 U.S.C. 154(b) by 130 days.

(21) Appl. No.: 10/423,362

(22) Filed: Apr. 25, 2003

(65) Prior Publication Data

US 2004/0014864 A1 Jan. 22, 2004

Related U.S. Application Data

(63) Continuation-in-part of application No. 10/146,162, filed on May 15, 2002, now abandoned.

(51) Int. Cl.$^7$ .............................. C09D 5/29; C08K 3/10; C08K 3/22
(52) U.S. Cl. ...................... 523/171; 524/423; 524/425; 524/436; 524/437; 524/523
(58) Field of Search .............................. 524/423, 425, 524/430, 436, 437, 523; 427/385.5; 523/171

(56) References Cited

U.S. PATENT DOCUMENTS

| | | | |
|---|---|---|---|
| 4,085,246 A | * 4/1978 | Buser et al. ................ 428/220 |
| 4,591,533 A | 5/1986 | Antonelli et al. |
| 4,659,783 A | * 4/1987 | Spinelli ...................... 525/293 |
| 5,476,895 A | * 12/1995 | Ghahary ..................... 524/437 |
| 5,789,032 A | 8/1998 | Le Cong et al. |
| 6,423,771 B1 | 7/2002 | Dworak et al. |
| 6,476,100 B2 | * 11/2002 | Diao et al. .................. 523/401 |
| 2003/0049457 A1 | 3/2003 | Munzmay et al. |
| 2003/0060560 A1 | * 3/2003 | Baugh et al. ............... 524/558 |
| 2005/0020763 A1 | 1/2005 | Milic |

FOREIGN PATENT DOCUMENTS

| | | | |
|---|---|---|---|
| EP | 1362874 A2 | 11/2003 | |
| JP | 09188556 A | * 7/1997 | ............ C04B/26/06 |
| WO | WO 97/40113 | 10/1997 | |

\* cited by examiner

*Primary Examiner*—Vasu Jagannathan
*Assistant Examiner*—Vickey Ronesi
(74) *Attorney, Agent, or Firm*—Steven C. Benjamin

(57) ABSTRACT

A coating composition comprising (a) 10 to 60 wt. % of one or more hydroxy-, carboxy- and/or amino-functionalized solid resins selected from the group of methacrylic resins, acrylic resins, polyester resins, polyurethane resins, epoxy modified resins with linear, branched or star structure, (b) 5 to 40 wt. % of one or more crosslinking agents for component (a), (c) 5 to 70 wt. % of a filler, such as, aluminum hydroxide, (d) 0 to 40 wt. % of a ground polymer material, (e) 0 to 35 wt. % of organic solvents, (f) 0.01 to 15 wt. % % of additives and pigments and (g) 0 to 30 wt. % reactive thinners.

8 Claims, No Drawings

DECORATIVE COATING COMPOSITION FOR SOLID SUBSTRATES

CROSS REFERENCE TO RELATED APPLICATION

This application is a continuation in part application of Ser. No. 10/146,162 filed May 15, 2002, which is now abandoned.

FIELD OF THE INVENTION

The invention relates to a coating composition for a substrate that provides a decorative surface having a stone, marble or granite-like effect and unique aesthetics and the resulting coated substrate can be used, for example, as building materials, for counter tops, wall panels, furniture, and for various other articles.

BACKGROUND OF THE INVENTION

Coatings for substrates used in industrial and housekeeping fields, e.g., for surfaces in kitchens, baths and stores or for wall panels, furniture and other articles in home and business sectors, can have a solid color or stone, granite, or marble-like or other unique appearance.

Such coatings comprise a filled polymer composition that is cured at ambient temperature or can be force-dried at elevated temperature. The coated articles can be costly to produce and difficult to transport and to install due to their heavy and brittle properties, e.g., they are fragile and easily chipped, broken or abused. The breakage rate at the required thickness makes these articles expensive.

Examples for known coatings and coated substrates are described as follows: JP 10128911, JP 8295548, JP 55126583, which relate to coating layers based on thermoplastic resins, such as, polyester, acrylic resins, and reinforced fiber.

U.S. Pat. No. 5,789,032 relates to a curable composition including polyester resin and filler useful for the production of stone, marble, or granite effect coatings. A vibration action is needed to level the composition and to form an equable coating on the surface.

The present invention satisfies the demand for a decorative and robust coating for interior and exterior surfaces, especially for horizontal and vertical working tops, panels; furniture in homes, offices or industrial buildings; counter and dining tables, counter tops, floors; architectural facing of buildings and various articles (lamps, vases, picture frames, etc.) of all types. The coating composition is a highly filled composition comprising a selected solid resin, a filler, decorative granules or other aesthetic materials, and special additive systems.

SUMMARY OF THE INVENTION

The present invention is directed to a high-filled coating composition comprising (a) 10 to 60 wt % of one or more hydroxy-, carboxy- and/or amino-functionalized solid resins selected from the group of methacrylic resins, acrylic resins, polyester resins, polyurethane resins, epoxy modified resins with linear, branched or star structure, (b) 5 to 40 wt. % of one or more crosslinking agents for component (a), (c) 5 to 70 wt. % of a filler material, (d) 0 to 40 wt. % of a ground polymer material, (e) 0 to 35 wt. % of organic solvents, (f) 0.01 to 15 wt. % of additives and pigments and (g) 0 to 30 wt. % reactive thinners.

The composition can be formed as a flowable liquid or as a solid composition without organic solvent and reactive thinners and is cured after application on the substrate. The cured coating can be sanded and polished; and the final article can be cut into a desired shape if necessary.

Relating to the flowable liquid composition the component (b) comprises one or more polyisocyanates selected from the group consisting of blocked and unblocked polyisocyanates.

Relating to the solid composition without organic solvents and reactive thinners, the component (b) comprises one or more crosslinkers, such as hydroxyl, carboxyl, amide or amino groups containing crosslinkers, cycloaliphatic, aliphatic or aromatic polyisocyanates, epoxy groups containing crosslinkers or carboxy-functional polymers.

The appearance of the final coating prepared from the coating composition according to the invention is characterized by a solid and/or a stone-, granite-, marble-like appearance or other special aesthetic appearance. The articles produced with the coating composition according to the invention can be used as decorative surfaces, e.g., countertops, wall panels, for furniture, for floors, and for all types of various articles. The coatings and the coated products are robust and stable and are workable and repairable. The coatings can be applied in a factory or on location. They have an appearance of stone, cultured marble or granite, such as, the material Corian®. The coating composition can be applied on a vertical panel without sagging within a dry thickness range from 25 to 30 mils (0.635 to 7.62 mm) by a single application, and the composition can be characterized as a low VOC (Volatile Organic Content) composition.

DETAILED DESCRIPTION OF THE INVENTION

The resins of component a) are functionalized by hydroxy and/or carboxy and/or amino groups. The OH-value and the COOH-value can be, for example, in the range from 10 to 300. Particularly preferred, are hydroxy and/or carboxy functionalized resins having an OH-value in the range of 10 to 300 and a carboxy value of 10 to 50. If amino groups are present, hindered secondary amino groups are preferred.

The functionalized resins can be manufactured by polymerization reactions known by a skilled person, especially by a radical polymerization but also, e.g., by a polymerization reaction caused by a photochemical reaction or by electromagnetic radiation. Group Transfer Polymerization can also be used.

The resins can be linear, branched or star structured.

The resins, component a), are contained in the range from about 10 to 60 wt. %, preferably from about 10 wt. % to 30 wt. %, based on the coating composition.

Suitable monomers or co-monomers for the manufacture of the acrylic and methacrylic polymers of component a) may be, e.g., acrylates, methacrylates, methyl methacrylates, styrene, acrylonitrile, vinyl acetate, butadiene, including monomers, such as, acrylic acid, methacrylic acid, itaconic acid, maleic acid, crotonic acid and/or amides. To obtain the functionalized polymethacrylics and polyacrylics, suitable monomers can be incorporated into the polymer, e.g., carboxy-functionalized monomers, such as, maleic acid, acrylic acid and methacrylic acid, and, for example, hydroxy-functionalized monomers, such as, hydroxy acrylates, hydroxy methyl acrylates, propylene glycol methacrylates, butanediol monoacrylates and the like.

Suitable monomers or co-monomers for the manufacture of the functionalized polyesters may be, for example, neopentyl glycol, cyclohexanedimethanol, 1,6 hexanediol, trimethylolpropane, pentaerythritol, phthalic anhydride, isophthalic acid, hexahydrophthalic anhydride, adipic acid, azelaic acid and dimer fatty acids.

The polyesters can be, for example, linear, branched, star structured, chemically modified by urethanes, silicones, styrene, acrylics, epoxide, and the range of the OH value can be 10 to 300.

Star resins may be used as component a) and are oligomers with a star structure, which have 3 to 6 arms. Oligomers are prepared by reaction of trimethylolpropane, pentaerythritol or other multifunctional compounds with, e.g., compounds containing glycidyl groups. They include polyester bonds and both primary and secondary hydroxyl groups.

As component a) one or more acrylic, methacrylic, polyester and/or star polymers are preferred.

The crosslinking agents, component b), of the coating composition are present in the range from about 5 to 40 wt. %, preferably from about 5 wt. % to 20 wt. %, based on the coating composition.

Examples of polyisocyanates that may be used as component b) are in the free or blocked form as crosslinking agents and may include triisocyanates, diisocyanates, and cycloaliphatic diisocyanates, such as, 1,6-hexane diisocyanate, trimethylhexane diisocyanates, 1,12-dodecanediisocyanates, cyclohexane diisocyanates, isophorones, diisocyanates with cyclohexylmethane diisocyanates or mixtures thereof, and polyisocyanates derived from such diisocyanates, for example, those containing hetero atoms in the radical linking the isocyanates groups. Examples thereof include polyisocyanates containing carbo diimide groups, isocyanurate groups, urethdiol groups, urethane groups and/or biuret groups.

Suitable blocking agents for the polyisocyanate crosslinking agents described above may include the conventional, for example, CH-acidic, NH—, SH— or OH— functional blocking agents. Examples include acetyl, acetone, acetoacetic acid acyl esters, valonic acid diacyl esters, aliphatic or cycloaliphatic alcohols, oximes, lactams, imidacoles, pyracoles.

Isocyanurates, biurets, uretdions, or allofanates of 1,6-hexane diisocyanate are the preferred compounds of component b).

Examples of other crosslinkers that can be used as component b) are crosslinkers containing reactive groups, such as hydroxyl, carboxyl, amide or amino groups; cycloaliphatic, aliphatic or aromatic polyisocyanates, crosslinkers containing epoxy groups, carboxy-functional polymers that may be used as component (b) are, for example, dicyandiamide and derivatives thereof; carboxylic acids or anhydrides thereof, triglycidyl isocyanurates, polyglycidyl ethers based on diethylene glycol, glycidyl-functionalized (meth)acrylic copolymers, and dicarboxylic acids having 10 to 12 carbon atoms.

The coating composition according to the invention contains a filler material as component c). The content of this filler material component is from 5 wt. % to 70 wt. %, preferably 10 wt. % to 60 wt. %, based on the coating composition. Examples of such filler materials are aluminum hydroxide, also known as alumina trihydrate, $Al_2O_3 3 H_2O$, calcium carbonate ($CaCO_3$), silica ($SiO_2$), magnesium hydroxide ($Mg(OH)_2$), barium sulfate ($BaSO_4$), clays, talcs, alumina monohydrate ($Al_2O_3H_2O$) or polymeric fillers. Preferably, aluminum hydroxide ($Al_2O_3 3 H_2O$) is used as component c).

The component d) is a small-grained solid material, which is different from component c), and is a ground polymer material. The content of this component d) is from 0 wt. % to 40 wt. %, preferably 2 wt. % to 30 wt. %, based on the coating composition.

This material can be based on polymethyl methacrylate (pMMA), crosslinked unsaturated polyester, epoxide or other polymeric material—filled or unfilled.

This material can be ground or calendered by mills, grinders or calender to small particles like granules, crunchies, flakes, and powder particles. The material can be toned in different colors or in one color. Examples of additives used in this material are, e.g., colorants, antioxidants, catalysts, light stabilizers, and also fillers. One example for the component d) is a filled polymer material consisting of about 40% of polymethyl methacrylate, of about 60% of aluminum hydroxide, colorants, and other additives at low levels, for example, known under the name of Corian®, which is a product of DuPont.

Examples of organic solvents that may be used in the coating composition according to the invention as component e) include glycol ethers, such as, butyl glycol, butyl diglycol, dipropylene glycol, dimethyl ether, dipropylene glycol monomethyl ether, ethylene glycol dimethyl ether; glycol ether esters, such as, ethyl glycol acetates, butyl diglycol acetates, methoxypropyl acetates; esters, such as, ethyl acetate, butyl acetate, isobutyl acetate, amyl acetate; ketones, such as, methyl ethyl ketone, methyl propyl ketone, methyl isopropyl ketone, methyl isobutyl ketone, diisobutyl ketone, methyl amyl ketone, cyclohexanone, isophorones; alcohols, such as, methanol, ethanol, propanol, butanol; aromatic hydrocarbons, such as, toluene, xylenes, Solvesso® 100 (mixture of aromatic hydrocarbons with a boiling range from 155 to 185° C.), Solvesso® 150 (mixture of aromatic hydrocarbons with a boiling range from 182 to 202° C.), and aliphatic hydrocarbons.

The organic solvents are contained in the range from 0 to 35 wt. %, preferably in a range of 10 to 25 wt. %, based on the coating composition, in the case of liquid compositions according to the invention.

Solid compositions according to the invention do not contain any organic solvent as component e).

The coating composition may contain conventional coating additives in total amount up to 15 wt. % based on coating composition ready for application, for example, leveling and anticratering agents, defoamers, dispersing and wetting additives, rheological modifiers, such as, pyrogenic silica, modified clays, polyamides and urea group-containing reaction products of amines (sagging control agents), catalysts, colorants, light stabilizers, UV absorbers, antioxidants and the like.

Depending on the intended use of the coating composition and on the integrated components, the coating composition may be unpigmented (transparent), translucent, or contain pigments. They may therefore contain fillers, which are different from the component c) and/or transparent, color imparting and/or special effect-imparting pigments. Examples of inorganic or organic color-imparting pigments include titanium dioxides, micronized titanium dioxide, iron oxide pigments, carbon black, azo pigments, phthalocyanine pigments, quinacridone or pyrrolopyrrole pigments. Examples of special effect-imparting pigments include metallic pigments, interference pigments, e.g., metal oxide coated metallic pigments, e.g., titanium dioxide-coated or mixed oxide-coated aluminum, coated mica, e.g. titanium dioxide-coated mica and graphite effect like special-effect pigments. Examples of suitable fillers include aluminum trihydrate, silica, aluminum silicates, barium sulfates, calcium carbonates, and talc.

Optionally, any material may be added for a decorative effect. Decorative additives, such as, crushed stones, gemstones, metal flake or fillings, micas, seashells, pearls, colored or transparent polymeric particles or fibers, mirrored particles and pigments may be added in quantities according to taste or fashion.

However, these quantities usually do not exceed 5% by weight, preferably 2% by weight. The decorative additives may be thoroughly mixed with the other components or placed on the surface.

Liquid coating composition according to this invention may contain reactive thinners as component (g) in the range of 0 to 30 wt. %, preferred in the range of 2 to 10 wt. %.

Examples for the thinners are ketimines, aminofunctional compounds, such as, for example, 1-aza-3,7-dioxo-bicyclo-2,8-diisopropyl-5-ethyl(3.3.0)octane and also oxazolidine derivatives, such as, for example, 3-ethyl-2-methyl-2-(3-methylbutyl)-1,3-oxazolidine.

The use of oxazolidines is preferred.

Solid compositions according to this invention do not contain any reactive thinners as component g).

The coating composition according to the invention may have a uniform color, a stone-like and/or a special aesthetic.

The liquid coating composition according to the invention in the state ready for application has a solids content, formed from the resins solids and the optionally contained non-volatile additives and optionally contained pigments, from 40 wt. % to 80 wt. %. The coating composition contains, as volatile constituents, organic solvents as mentioned above.

The coating composition can take the form of a one-component coating composition or a two-component composition. In case of a two-component coating composition, one component contains the resins of component a) and the other component contains the polyisocyanates. The other components of the coating composition according to the invention, that means the aluminum hydroxide, the ground material, organic solvents, additives and thinners may be presented in either one or in both of the two components. Preferably they may be present in the component which contains the resins of component a).

The coating composition according to the invention may be used in the preparation of a one-layer coating on any substrates of, for example, metal, plastic, or substrates composed of a mixed construction of metal and plastic and of any other material, for example, clay, tile, woven glass fiber, masonites and the like. Substrates employed include also plywood, particle board, medium-density fiber board (MDF board), tile board. These substrates can be used as products, such as, existing and in place counter tops, cabinets, wall panels, furniture, slab boards, ceramic tile, high pressure laminate (HPL), low pressure laminate and other such laminates, stainless steel, gypsum board, glass and the like. The coating composition may also be applied directly over ceramic tile/group installations in such a way that a seamless surface is formed with tile-like appearance.

The coating composition according to the invention can be applied directly on the untreated surface of a substrate, for example, of a porous substrate. It is also possible to use the coating composition according to the invention for a multi-layer coating of the substrate whereby the multi-layer coating may consist of several coating layers of the coating composition of the invention. Smooth or glass like surface should be coated, for example, by an 2-pack epoxy primer or other appropriate primer to ensure proper adhesion of the coating composition according to the invention. Preferably the coating composition is used as a direct coating of the untreated surface of a porous substrate.

In the event the coating composition is used for outdoor purposes, for example, on the exterior of a building, the weatherability of the composition can be improved by the addition of an ultraviolet light stabilizer or a combination of ultraviolet light stabilizers in the amount of 0.1% to 5% by weight, based on the weight of the composition. Such stabilizers include ultraviolet light absorbers, screeners, quenchers, and specified hindered amine light stabilizers. Also, an antioxidant can be added, in the amount 0.1% to 2% by weight, based on the weight of the composition.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533. Typically useful hindered amine light stabilizers that can be used are, for example, Tinuvin® 928 and Tinuvin®123 or mixtures thereof, commercially available from Ciba Specialty Chemicals, Tarrytown, N.Y.

The coating composition according to the invention can be applied by known methods. In the case of liquid compositions, they can be applied, e.g., via commercial spray gun equipment, preferably by spray gun with a pressured upper container. Solid compositions can be applied by known electrostatic spraying processes used for the application of powder coating compositions, for example, corona or tribo spray guns can be used and other suitable powder application processes, for example, an aqueous dispersion of the solid powder composition (aqueous powder slurry) can be applied or a broad band spreading process can be used to apply the composition.

Particularly, the composition according to the invention in the dry or liquid form can be applied in a dry layer thickness of, for example, 25 to 30 mils (0.635 to 0.762 mm) regarding a one-layer application and in a dry film thickness of, for example, 45 to 50 mils (1.143 to 1.27 mm) by a multi-layer deposition of the coating composition. The final coating thickness can be designed to be, for example, 60 to 80 mils (1.524 to 2.032 mm) or thicker and can be built in 25 to 30 mils (0.635 to 0.762 mm) increments per single application depending on the intended use.

The applied coating composition according to the invention can be cured by crosslinking at ambient temperature as well as at elevated temperature. It is desirable, but not necessarily, to have a short flash-off phase before start of the curing step at elevated temperature. The curing temperature can vary from 15 to 100° C., particularly from 25 to 80° C. The curing times are, for example, of the order of magnitude of 20 min. to 24 hours. Preferably the coating composition according to the invention is crosslinked at ambient temperature in the range of 15 to 35° C., preferably of 20 to 30° C. in the time range to 24 hours. If forced drying is applied for curing, temperature range 60 to 100° C. is recommended, preferably of 60 to 80° C., in a time range of 20 to 60 minutes. A hard, crosslinked surface is obtained with a glossy lacquer-like appearance having good resistance to chemicals, outstanding mar resistance and very good optical properties.

The cured coating can be sanded and/or polished to achieve a smooth surface of a desired thickness. The coated substrate or article can be cut into desired shapes.

The cured surface has a high quality that means scratch-resistance, stain-resistance, heat-resistance, chip-resistance and superior hardness. The sanding can be used to reduce the thickness to a desired value, to obtain a smooth surface and/or to bring out an aesthetic quality.

It is possible to replace solid and/or cast materials, such as, marble or granite slabs, walls, panels and the like by substrates coated with the coating composition according to the invention with a high stability and strength as well as a high weather proof property with a good heat and stain resistance.

The coating composition can also be used for store fixtures, vertical surfacing on substrates of all types and also horizontal surfacing. It could replace wallpaper. Formulations can be used outdoors as architectural facings, for example, with a proper UV stabilization.

The following examples illustrate the invention. All parts and percentages are on a weight basis unless otherwise noted. Molecular weights are determined by gel permeation chromatography using polymethylmethacrylate as the standard.

EXAMPLES

Example 1

Preparation of Coating Compositions of the Invention

Composition 1:

| | | Wt. % |
|---|---|---|
| | Part A | |
| 1 | Desmophen ® A 265 BA (Acrylic polymer with 2% of OH groups, 65 wt. % in butyl acetate, manufactured by Bayer) | 10.35 |
| 2 | Desmophen ® 670 BA (Polyester resin with 6.7% of OH groups, 80 wt. % in butyl acetate, manufactured by Bayer) | 7.75 |
| 3 | Methyl isobutyl ketone, solvent | 14.92 |
| 4 | Pot-life retarder (2,4-pentane dione) | 1.21 |
| 5 | Catalyst (1,4-diazabicyclo[2.2.2]octane, 33 wt. % in dipropylene glycol) | 0.077 |
| 6 | Catalyst (100% dibutyltin dilaurate) | 0.003 |
| 7 | EFKA ®-2022 (Organically modified polysiloxane in solvent mixture, defoamer, manufactured by EFKA ® Additives, the Netherlands) | 1.10 |
| 8 | EFKA ® -3031 (52 wt. % organically modified polysiloxane in alkyl benzene, leveling and anticratering agent, manufactured by EFKA ® Additives, the Netherlands) | 0.29 |
| 9 | EFKA ®-4047 (35% wt. % high molecular weight modified polyurethane in butyl acetate, dispersing additive, manufactured by EFKA ® Additives, the Netherlands) | 1.03 |
| 10 | Thixatrol ® Plus (polyamide, rheological additive, manufactured by Elementis) | 0.28 |
| 11 | Aerosil ® R972 (Fumed silica hydrophobically modified rheological additive having a BET value of 110 m²/g, manufactured by Degussa) | 1.45 |
| 12 | Aluminum trihydrate, filler | 12.91 |
| 13 | Hindered Amine Light Stabilizer [Bis(1,2,2,6,6-pentamethyl-4-piperidyl) sebacate and methyl(1,2,2,6,6-pentamethyl-4-piperidyl) sebacate] | 0.23 |
| 14 | UV absorber (Methyl-3-[3-(2H-benzotriazol-2-yl)-5-tert.butyl-4-hydroxyphenyl]propionate) | 0.46 |
| 15 | Corian ® Crunchies (Ground polymer material of polymethymethacrylate filled with alumina trihydrate and various fillers) | 28.36 |

-continued

| | Wt. % |
|---|---|
| Part B | |
| Activator (Hexamethylene diisocyanate isocyanurate, 19.6% NCO, 90 wt. % in butyl acetate) | 10.14 |
| Thinner | |
| Ethyl acetate | 9.44 |

Components 1 to 14 are premixed by high-speed disperser and then ground in bead mill to fineness of grinding 6 of Hegman scale. The resulting composition is immediately mixed with component 15—ground polymer material.

Before application, Part A is mixed with Part B in weight ratio 100:12.6 and thinned by approx. 9 wt. % of Thinner to application viscosity—flow time 25 seconds using a Ford Cup with jet diameter 6 mm. Evaluation of the flow time is performed according to ASTM D-1200 at 25° C.

Composition 2:

| | | Wt. % |
|---|---|---|
| | Part A | |
| 1 | Potlife retarder (2,4-pentane dione) | 2.01 |
| 2 | Aerosil ® R972 (described above) | 0.67 |
| 3 | Aluminum trihydrate, filler | 27.79 |
| 4 | Corian ® Crunchies (described above) | 11.66 |
| 5 | Catalyst (1,4-diazabicyclo[2.2.2]octane, 33 wt. % in dipropylene glycol) | 0.155 |
| 6 | Catalyst (100% dibutyltin dilaurate) | 0.005 |
| 7 | Desmophen ® A 365 BA/X (acrylic polymer with 2.9% of OH groups, 65 wt. % in butyl acetate/xylene, manufactured by Bayer) | 18.62 |
| 8 | Dukon 21 (80 wt. % star polymer with 4.9% of OH groups in butyl acetate, manufactured by Spolek, the Czech Republic) | 4.95 |
| 9 | EFKA ®-2023 (Organically modified polysiloxane in solvent mixture, defoamer, manufactured by EFKA ® Additives, the Netherlands) | 0.30 |
| 10 | EFKA ®-3772 (60 wt. % fluorocarbon modified polyacrylate in secondary butanol, leveling and anti-cratering agent, manufactured by EFKA ® Additives, the Netherlands) | 0.99 |
| 11 | EFKA ®-8530 (100% aliphatic polyether with acidic groups, dispersing additive, manufactured by EFKA ® Additives, the Netherlands) | 1.03 |
| 12 | Ethyl acetate, solvent | 8.92 |
| 13 | Thixatrol ® Plus (described above) | 0.26 |
| 14 | Hindered Amine Light Stabilizer (described above) | 0.23 |
| 15 | UV absorber (described above) | 0.46 |
| | Part B | |
| | Activator (described above) | 9.51 |
| | Thinner | |
| | Aromatic hydrocarbon | 5.72 |
| | Ethyl acetate | 5.72 |

Components 1 to 15 (except component 4) are premixed by high-speed disperser and then ground in bead mill to fineness of grinding 6 of Hegman scale. The resulting composition is immediately mixed with component 4.

Before application, Part A is mixed with Part B in weight ratio 100:12 and thinned by approximately 13 wt. % of Thinner to application viscosity—flow time 22 seconds using a Ford Cup with jet diameter 6 mm. Evaluation of the flow time is performed according to ASTM D-1200 at 25° C.

Composition 3:

| | Wt. % |
|---|---|
| Part A | |
| Duroftal ® VPI 2801 (Polyester with 6.6% OH, 80 wt. % in butyl acetate, manufactured by Solutia) | 16.65 |
| Desmophen ® VP LS 2973 (Aminofunctional polyester reactive thinner, ekv. weight 396, manufactured by Bayer) | 3.72 |
| Butyl acetate, solvent | 4.73 |
| Catalyst (1,4-diazabicyclo[2.2.2]octane, 33 wt. % in dipropylene glycol) | 0.024 |
| Catalyst (100% dibutyltin dilaurate) | 0.006 |
| EFKA ®-2022 (Defoamer-described above) | 1.10 |
| EFKA ®-3772 (Fluorocarbon modified polyacrylate-described above) | 0.99 |
| EFKA ®-4047 (Dispersing additive-described above) | 1.03 |
| Hindered Amine Light Stabilizer (Described above) | 0.53 |
| UV absorber (Described above) | 1.10 |
| Thixatrol ® ST (100% castor oil derivative rheological additive) | 0.50 |
| Aerosil ® R972 (Fumed silica-described above) | 0.27 |
| Aluminum trihydrate, filler | 21.56 |
| Barium sulfate | 6.90 |
| Part B | |
| Hexamethylene diisocyanate uretdione activator (100%, 21.8% NCO) | 12.63 |
| Butyl acetate, solvent | 5.22 |
| Corian ® Crunchies (described above) | 18.20 |
| Thinner | |
| Ethyl acetate | 4.84 |

All components of Part A are premixed by high-speed disperser and then ground in bead mill to fineness of grinding 6 of Hegman scale.

Part B preparation: Corian® Crunchies are added in small amounts to the solution of Activator in butyl acetate and the mixture is homogenized by high-speed dissolver.

Before application, Part A is mixed with Part B in weight ratio 100:61 and thinned by approx. 5 wt. % of Thinner to application viscosity—flow time 22 seconds using a Ford Cup with jet diameter 6 mm. Evaluation of the flow time is performed according to ASTM D-1200 at 25° C.

Example 2

Application on Plywood Substrate

A mixture of both part A and B of Composition 2 from Example 1 is applied by spray gun with pressured upper container and jet nozzle diameter 2.3 mm on a plywood substrate. The pressure on spray gun jet nozzle is about 0.2 MPa and the overpressure in upper container is about 7 kPa. Wet thickness of the first layer should be maximally 10 mils (0.250 mm) to ensure good adhesion and low content of entrapped solvents close to the surface. After 1 hour of drying at ambient temperature the film is force-dried in oven for one hour at 60° C. The second and the next layers are sprayed on the force-dried film after the substrate is cooled to room temperature and the thickness is about 20 to 30 mils (0.508 to 0.762 mm). The resulting film is force dried at 60° C. for 1 hour or can be dried at room temperature for at least 24 hours before the next layer is applied. When the required thickness is reached, 60 to 80 mils (1.524 to 2.032 mm), the films are post-cured at 60 to 80° C. for several hours to accelerate the hardness development and to improve sandability.

Example 3

Application on Glazy Ceramic Tiles

Commercially available two-pack epoxy primer was mixed with hardener and thinned to an application viscosity (flow time 18 to 20 seconds at Ford Cup with jet diameter 4 mm). A layer of film is applied by spraying on the tile substrate with a spray gun having a jet nozzle diameter of 18 mm and a jet nozzle pressure 0.17 to 0.2 MPa.

The primer was applied on smooth glazy ceramic tiles in wet thickness about 0.100 mm. This film was allowed to dry at ambient temperature for 24 hours.

The mixture of both part A and B of Composition 1 from Example 1 was applied by spray gun with pressured upper container and jet nozzle diameter 2.3 mm. The pressure on spray gun jet nozzle is about 0.2 MPa and the overpressure in upper container is about 7 kPa. Each applied layer has a dry film thickness about 20 to 30 mils (0.508 to 0.762 mm).

The first layer is dried for 1 hour at ambient temperature and then the film is force-dried in oven for one hour at 60° C. The second and the next layers are sprayed on the force-dried film after the substrate is cooled to room temperature. Forced drying at 60° C. for 1 hour or room temperature drying for at least 24 hours is necessary before the next layer is applied. When the required thickness is reached, 60 to 80 mils (1.524 to 2.032 mm), the coated films are cured at ambient temperature for several days to achieve appropriate film hardness for good sandability.

Example 4

Application on Particle Board Substrate

A mixture of both part A and B of Composition 3 from Example 1 is applied by spray gun with pressured upper container and jet nozzle diameter 2.3 mm on a substrate. The pressure on spray gun jet nozzle is about 0.2 MPa; the overpressure in upper container is about 7 kPa.

Wet thickness of the first layer should be maximally 10 mils (0.250 mm) to ensure good adhesion and low content of entrapped solvents close to the surface. After 1 hour of drying at ambient temperature the film is force-dried in oven for one hour at 60° C. The second and the next layers are sprayed on the force-dried film after the substrate is cooled to room temperature and can be thicker—about 20 to 30 mils (0.508 to 0.762 mm). The film layers are forced dried at 60° C. for 1 hour or can be dried at room temperature drying for at least 24 hours before the next layer is applied. When the required thickness is reached 60 to 80 mils (1.524 to 2.032 mm), the coated films are post-cured at 60 to 80° C. for several hours to accelerate the hardness development and to improve sandability.

What is claimed:

1. A coating composition comprising
   (a) 10 to 60 wt. % of a functionalized solid resin having functional groups selected from the group consisting of hydroxy-, carboxy- amino- and any mixtures thereof and wherein the functionalized solid resins have a linear, branched or star structure and are selected from the group consisting of methacrylic resins, acrylic resins, polyester resins, polyurethane resins, and epoxy modified resins,
   (b) 5 to 40 wt. % of at least one crosslinking agent for component (a), selected from the group consisting of hydroxyl, carboxyl, amide or amino group containing crosslinking agents, cycloaliphatic aliphatic or aromatic polyisocyanates, epoxy group containing crosslinking agents, and carboxy-functional polymers;
   (c) 5 to 70 wt. % of filler material selected from the group consisting of aluminum hydroxide, alumina monohydrate, calcium carbonate, magnesium hydroxide and barium sulfate, (d) 2 to 40 wt. % of a ground polymer material based on polymethyl methacrylate filler which is a filled polymer material comprising about 40 wt. % polymethyl methacrylate and about 60 wt. % of aluminum hydroxide, (e) 10 to 35 wt. % of organic solvents selected from the group consisting of glycol ethers, glycol ether esters, ketones, aromatic hydrocarbons, aliphatic hydrocarbons and any mixtures thereof;

(f) 0.01 to 15 wt. % of additives and pigments and (g) 2 to 30 wt. % reactive thinners selected from the group consisting of ketimines, aminofunctional compounds and mixtures thereof.

2. The coating composition according to claim 1 wherein component (a) is one or more resins selected from the group consisting of acrylic resins, methacrylic resins, and polyester resins.

3. The coating composition according to claim 1 wherein component (b) is selected from the group consisting of isocyanurates, biurets, uretdions and allophanates of 1,6-hexane diisocyanate.

4. The coating composition according to claim 1 wherein component (c) is aluminum hydroxide.

5. The coating composition according to claim 1 comprising 2 to 30 wt. % of component (d).

6. The coating composition according to claim 1 wherein the composition is a flowable liquid composition and wherein (b) the crosslinking agent for component (a) comprises a polyisocyanate selected from the group consisting of blocked polyisocyanates and unblocked polyisocyanates.

7. The coating composition according to claim 6 wherein component (a) is one or more resins selected from the group consisting of acrylic resins, methacrylic resins, and polyester resins.

8. The coating composition according to claim 6 wherein component (b) is selected from the group consisting of isocyanurates, biurets, uretdions and allophanates of 1,6-hexane diisocyanate.

* * * * *